(12) United States Patent
Li et al.

(10) Patent No.: US 11,727,270 B2
(45) Date of Patent: Aug. 15, 2023

(54) CROSS DATA SET KNOWLEDGE DISTILLATION FOR TRAINING MACHINE LEARNING MODELS

(71) Applicant: MICROSOFT TECHNOLOGY LICENSING, LLC, Redmond, WA (US)

(72) Inventors: Ji Li, San Jose, CA (US); Amit Srivastava, San Jose, CA (US); Xingxing Zhang, Beijing (CN); Furu Wei, Beijing (CN); Ming Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 514 days.

(21) Appl. No.: 16/799,091

(22) Filed: Feb. 24, 2020

(65) Prior Publication Data
US 2021/0264106 A1 Aug. 26, 2021

(51) Int. Cl.
*G06F 40/40* (2020.01)
*G06N 3/08* (2023.01)
*G06F 40/205* (2020.01)
*G06F 18/214* (2023.01)
*G10L 15/16* (2006.01)
*G10L 15/18* (2013.01)
*G06N 3/088* (2023.01)
*G06F 40/30* (2020.01)

(52) U.S. Cl.
CPC .......... *G06N 3/08* (2013.01); *G06F 18/2148* (2023.01); *G06F 40/205* (2020.01); *G06F 40/40* (2020.01); *G06F 40/30* (2020.01); *G06N 3/088* (2013.01); *G10L 15/16* (2013.01); *G10L 15/18* (2013.01)

(58) Field of Classification Search
None
See application file for complete search history.

(56) References Cited

U.S. PATENT DOCUMENTS

| 7,546,235 | B2 | 6/2009 | Brockett et al. | |
|---|---|---|---|---|
| 9,367,763 | B1* | 6/2016 | Gordo Soldevila | .... G06F 16/50 |
| 11,210,607 | B2* | 12/2021 | Kenny | .................... G06N 20/20 |
| 2014/0244266 | A1* | 8/2014 | Brown | .................... G06F 3/167 |
| | | | | 715/764 |

(Continued)

FOREIGN PATENT DOCUMENTS

CN 109684478 A 4/2019

OTHER PUBLICATIONS

S. Abbasi, M. Hajabdollahi, N. Karimi, and S. Samavi, "Modeling teacher-student techniques in deep neural networks for knowledge distillation," in Proc. MVIP, 2020, pp. 1-6.*
Freitag et al., "Unsupervised Natural Language Generation with denoising autoencoders", Google AI, Aug. 24, 2018 (Year: 2018).*
"Non Final Office Action Issued in U.S. Appl. No. 16/490,440", dated Nov. 5, 2021, 18 Pages.

(Continued)

*Primary Examiner* — Richard Z Zhu
(74) *Attorney, Agent, or Firm* — NovoTechIP International PLLC

(57) ABSTRACT

A method and system for training a text-to-content recommendation ML model includes training a first ML model using a first training data set, utilizing the trained first ML model to infer information about the data contained in the first training data set, collecting the inferred information to generate a second training data set, and utilizing the first training data set and the second training data set to train a second ML model. The second ML model may be a text-to-content recommendation ML model.

20 Claims, 7 Drawing Sheets

(56) References Cited

U.S. PATENT DOCUMENTS

| | | | |
|---|---|---|---|
| 2016/0335493 A1 | 11/2016 | Zheng et al. | |
| 2017/0139569 A1 | 5/2017 | Della corte et al. | |
| 2017/0185581 A1* | 6/2017 | Bojja | G06V 30/40 |
| 2018/0158552 A1* | 6/2018 | Liu | G06N 3/0445 |
| 2018/0225281 A1 | 8/2018 | Song et al. | |
| 2019/0318723 A1* | 10/2019 | Sun | G10L 15/063 |
| 2020/0004823 A1* | 1/2020 | Chatterjee | G06N 5/022 |
| 2020/0250269 A1* | 8/2020 | Koseki | G06F 40/284 |
| 2020/0258498 A1 | 8/2020 | Reisswig et al. | |
| 2020/0364303 A1 | 11/2020 | Liu et al. | |
| 2020/0380310 A1* | 12/2020 | Weider | G06N 20/00 |
| 2020/0387782 A1* | 12/2020 | Hegde | G06N 3/063 |
| 2020/0394461 A1* | 12/2020 | Perera | G06N 20/00 |
| 2021/0064921 A1* | 3/2021 | Carbune | G06N 3/08 |
| 2021/0134274 A1 | 5/2021 | Lee | |
| 2021/0142164 A1* | 5/2021 | Liu | G06F 40/30 |
| 2021/0182077 A1 | 6/2021 | Chen et al. | |
| 2021/0182662 A1* | 6/2021 | Lai | G06N 3/08 |
| 2021/0192288 A1* | 6/2021 | Cao | G10L 25/27 |
| 2021/0334457 A1 | 10/2021 | Zhang et al. | |

OTHER PUBLICATIONS

Devlin, et al., "BERT: Pre-training of Deep Bidirectional Transformers for Language Understanding", In Repository of arXiv:1810.04805v1, Oct. 11, 2018, 14 Pages.

"International Search Report & Written Opinion issued in PCT Application No. PCT/CN19/085396", dated Feb. 20, 2020, 9 pages.

Sun, et al., "ERNIE: Enhanced Representation through Knowledge Integration", In Journal of arXiv preprint arXiv:1904.09223v1, Apr. 19, 2019, 8 Pages.

"Final Office Action Issued in U.S. Appl. No. 16/490,440", dated Feb. 17, 2022, 14 Pages.

"Notice of Allowance Issued in U.S. Appl. No. 16/490,440", dated Apr. 29, 2022, 10 Pages.

Glorot, et al., "Deep Sparse Rectifier Neural Networks", In Proceedings of the Fourteenth International Conference an Artificial Intelligence and Statistics, Apr. 11, 2011, pp. 315-323.

Pennington, et al., "GloVe: Global Vectors for Word Representation", In the Proceedings of the Empirical Methods in Natural Language Processing, Oct. 25, 2014, 12 Pages.

"Search Report Issued in European Patent Application No. 19926753.5", dated Nov. 15, 2022, 7 Pages.

* cited by examiner

CROSS DATA SET KNOWLEDGE DISTILLATION FOR TRAINING MACHINE LEARNING MODELS

BACKGROUND

Intelligent content recommendation services may be provided in a variety of computer programs. For example, text-to-content recommendation services may be used to suggest images, icons, or emoticons based on text received as an input in an application. To provide these services, some applications utilize one or more machine-learning (ML) models to offer various recommendations to users. For example, a text-to-content recommendation service utilizes one or more text-to-content ML models trained to provide content recommendations for text. Training such models, however, is often difficult, as the number of content available for recommendations can be large and new content may be added on a regular basis. Moreover, there are often restrictions on use of user-collected data. Furthermore, because of the large number of available content, manually annotating a data set may become too expensive. Still further, the resulting trained ML models may become too large to deploy and operate. For example, such trained ML models may require significant memory space to store and operate.

Hence, there is a need for improved systems and methods of intelligently training models that provide content recommendation services.

SUMMARY

In one general aspect, this disclosure presents a data processing system having a processor and a memory in communication with the processor wherein the memory stores executable instructions that, when executed by the processor, cause the data processing system to perform multiple functions. The function may include training a first ML model using a first training data set, utilizing the trained first ML model to infer information about the data contained in the first training data set, collecting the inferred information to generate a second training data set, and utilizing the first training data set and the second training data set to train a second ML model. The second ML model may be a text-to-content recommendation ML model.

In yet another general aspect, the instant application describes a method for training a text-to-content recommendation ML model. The method may include training a first ML model using a first training data set, utilizing the trained first ML model to infer information about the data contained in the first training data set, collecting the inferred information to generate a second training data set, and utilizing the first training data set and the second training data set to train a second ML model. The second ML model may be a text-to-content recommendation ML model.

In a further general aspect, the instant application describes a non-transitory computer readable medium on which are stored instructions that when executed cause a programmable device to train a first ML model using a first training data set, utilize the trained first ML model to infer information about the data contained in the first training data set, collect the inferred information to generate a second training data set, and utilize the first training data set and the second training data set to train a second ML model. The second ML model is a text-to-content recommendation ML model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
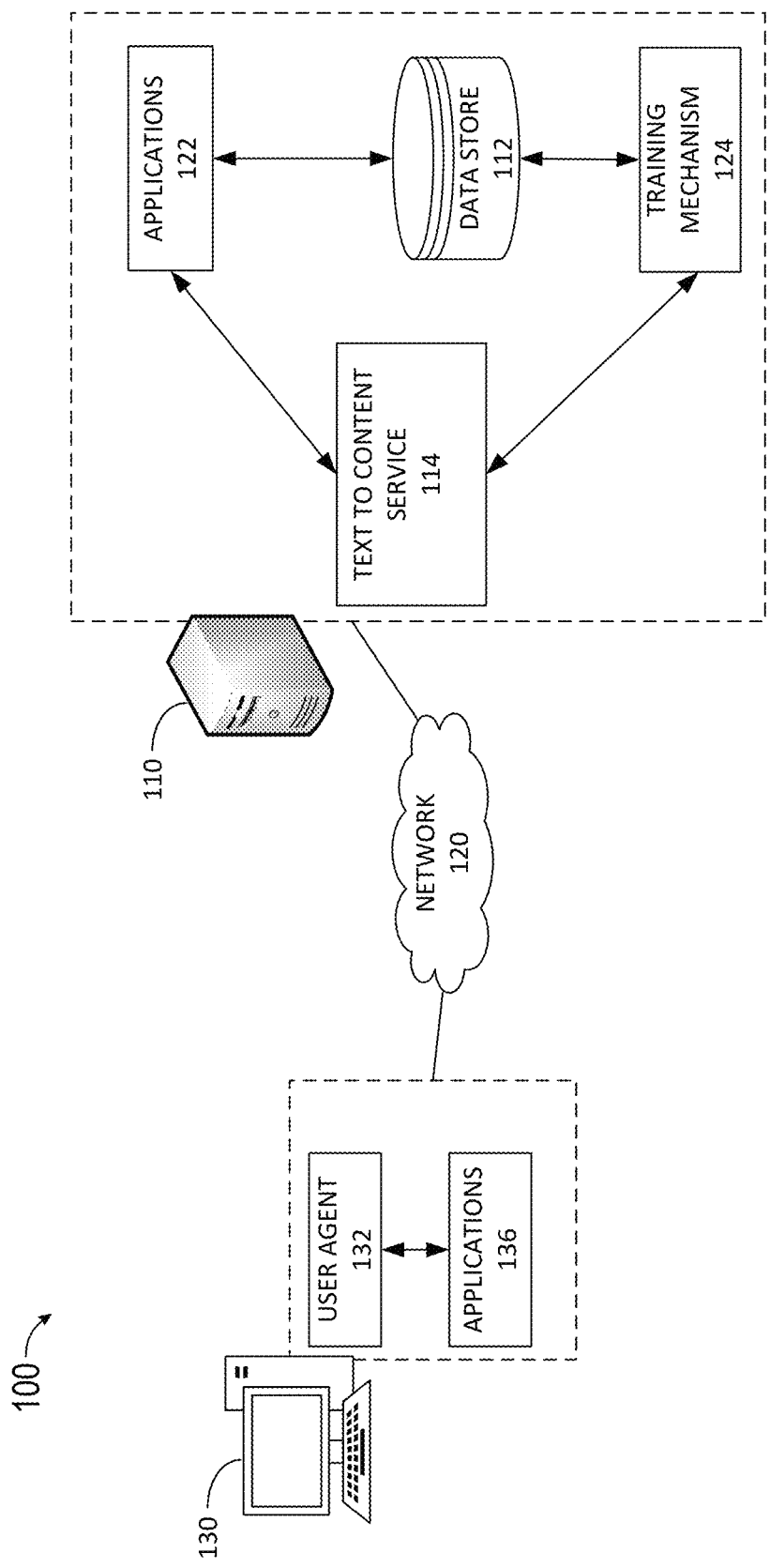
FIG. 1 depicts an example system in which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

A number of currently used applications offer recommendations to users in order to improve the quality of a document they are working on. Some of these recommendations include text-to-content recommendations that provide an easy way for users to choose content (e.g., images, icons, emoticon, or keywords) which corresponds to text in a document. This may be done by presenting a list of recommendations to the user based on the text in the document. The amount of content available for providing recommendations, however, is often significantly large. Many applications include numerous options to choose from and new content (e.g., images, icons, emoticon, or keywords) is often being regularly added.

To ensure that accurate recommendations are made, one or more ML models may be used. However, training ML models that provide accurate text-to-content recommendations is often difficult because most currently used text analysis algorithms are based on ordered sentences and data that includes the correct text sequence. However, to comply with privacy regulations, data in a user-based training data set may be partially filtered and/or words in the sentences may be shuffled to ensure the original text cannot be recovered. Data sets having data which includes correct text sequences may be provided via a human annotated training data set. However, creating a comprehensive human labeled training data set is often too cost prohibitive. Furthermore, currently available text analysis ML models are often large and difficult to store and deploy. This is particularly the case when multiple models are combined together to achieve better accuracy. However, most applications that make use of such models have specific latency requirements and/or may use a client device to run the models. The large size models may not satisfy the latency requirements of the applications and may not function well on a client device. Thus, currently available text-to-content recommendation models are difficult to train, require too much memory space to deploy and operate, and do not satisfy latency and size restrictions needed to run efficiently as part of an application on a client device.

To address these technical problems and more, in an example, this description provides technical solutions used for distilling knowledge from one or more large-sized trained models to train a light-weight neural network model that is small in size and provides improved accuracy. In an example, this is achieved by first training a variety of teacher models using different model structures and hyperparameters, and next distilling the knowledge of these teacher models by running them against labeled unordered training data sets to generate a transfer data set. Separately, a pretrained text analysis model may be trained (e.g., fine-tuned) by using an annotated training data set which is limited in size. The output of the text analysis model along with the transfer data set may then be used to train a shallow student model. Thus, knowledge is distilled from the more complex training models to train a smaller and simpler student model that is not only smaller in size and easier to deploy and operate but can also provide more accurate results. As a result, the solution provides an improved method of training ML models to increase accuracy and efficiency.

As will be understood by persons of skill in the art upon reading this disclosure, benefits and advantages provided by such implementations can include, but are not limited to, a solution to the technical problems of inefficient training and generating inaccurate and/or cumbersome ML models. Technical solutions and implementations provided herein optimize the process of training text-to-content models, increase accuracy in the content suggested and generate smaller models. The benefits provided by these solutions include more user-friendly applications, increased accuracy and increased system and user efficiency.

As a general matter, the methods and systems described herein may include, or otherwise make use of, a machine-trained model to identify content related to a text. Machine learning generally includes various algorithms that automatically build and improve over time. The foundation of these algorithms is generally built on mathematics and statistics that can be employed to predict events, classify entities, diagnose problems, and model function approximations. As an example, a system can be trained using data generated by an ML model in order to identify patterns in user activity, determine associations between various words and content (e.g., icons, images, or emoticons) and/or identify recommended content that relate to text entered by a given user. Such training may be made following the accumulation, review, and/or analysis of user data from a large number of users over time, which is configured to provide the ML algorithm (MLA) with an initial or ongoing training set. In addition, in some implementations, a user device can be configured to transmit data captured locally during use of relevant application(s) to local or remote ML programs and provide supplemental training data that can serve to fine-tune or increase the effectiveness of the MLA. The supplemental data can also be used to facilitate identification of content and/or to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and the subsequent ML models may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

FIG. 1 illustrates an example system 100, upon which aspects of this disclosure may be implemented. The system 100 may include a sever 110 which may be connected to or include a data store 112 which may function as a repository in which data sets relating to training models may be stored. The server 110 may operate as a shared resource server located at an enterprise accessible by various computer client devices such as client device 130. The server may also operate as a cloud-based server for offering text-to-content recommendation services in one or more applications such as applications 122.

The server 110 may include and/or execute a text-to-content service 114 which may provide intelligent text-tocontent recommendations for users utilizing applications on their client devices such as client device 130. The text-to-content service 114 may operate to examine data entered by a user via an application (e.g., applications 122 or applications 136), and suggest content corresponding to the entered data by utilizing various models. In an example, the text-to-content service 114 may include a text-to-icon model that provides recommended icons for text in a document. Other models may also be used. For example, a text-to-content service may include a text-to-image model, a text-to-emoticon model, or a text-to-keyword model.

Each of the models used as part of the text-to-content service 114 may be trained by a training mechanism 124. The training mechanism 124 may use training data sets stored in the data store 112 to provide an initial and ongoing training for each of the models. In one implementation, the training mechanism 124 may use unordered training data (e.g., stored user input data), ordered annotated training data, and/or inferred labeled training data from the data store 112 to train each of the models. The initial training may be performed in an offline stage.

The client device 130 may be connected to the server 110 via a network 120. The network 120 may be a wired or wireless network(s) or a combination of wired and wireless networks that connect one or more elements of the system 100. The client device 130 may be a personal or handheld computing device having or being connected to input/output elements that enable a user to interact with various applications (e.g., applications 122 or applications 136). Examples of suitable client devices 130 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 6 and 7.

The client device 130 may include one or more applications 136. Each application 136 may be a computer program executed on the client device 130 that configures the device to be responsive to user input to allow a user to interactively enter data into applications 136. Examples of suitable applications include, but are not limited to, a word processing application, a presentation application, a note taking application, and a communications application.

In some examples, applications used to receive user input and provide content recommendations may be executed on the server 110 (e.g., applications 122) and provided via an online service. In one implementation, web applications may communicate via the network 120 with a user agent 132, such as a browser, executing on the client device 130. The user agent 132 may provide a user interface that allows the user to interact with applications 122 and may enable applications 122 to provide user data to the data store 112 to be stored as training data. In other examples, applications used to receive user input and provide content recommendations maybe local applications such as the applications 136 that are stored and executed on the client device 130 and provide a user interface that allows the user to interact with the application. User data from applications 136 may also be provided via the network 120 to the data store 112 for use by the training mechanism 124.

It should be noted that the models providing text-to-content recommendations may be hosted locally on the client (e.g., text-to-content engine) or remotely in the cloud (e.g., text-to-content service). In one implementation, some models are hosted locally, while others are stored remotely. This enables the client device to provide some recommendations even when the client is not connected to a network. Once the client connects to the network, however, the application may be able to provide better and more complete text-to-content recommendations.

Figure 2:
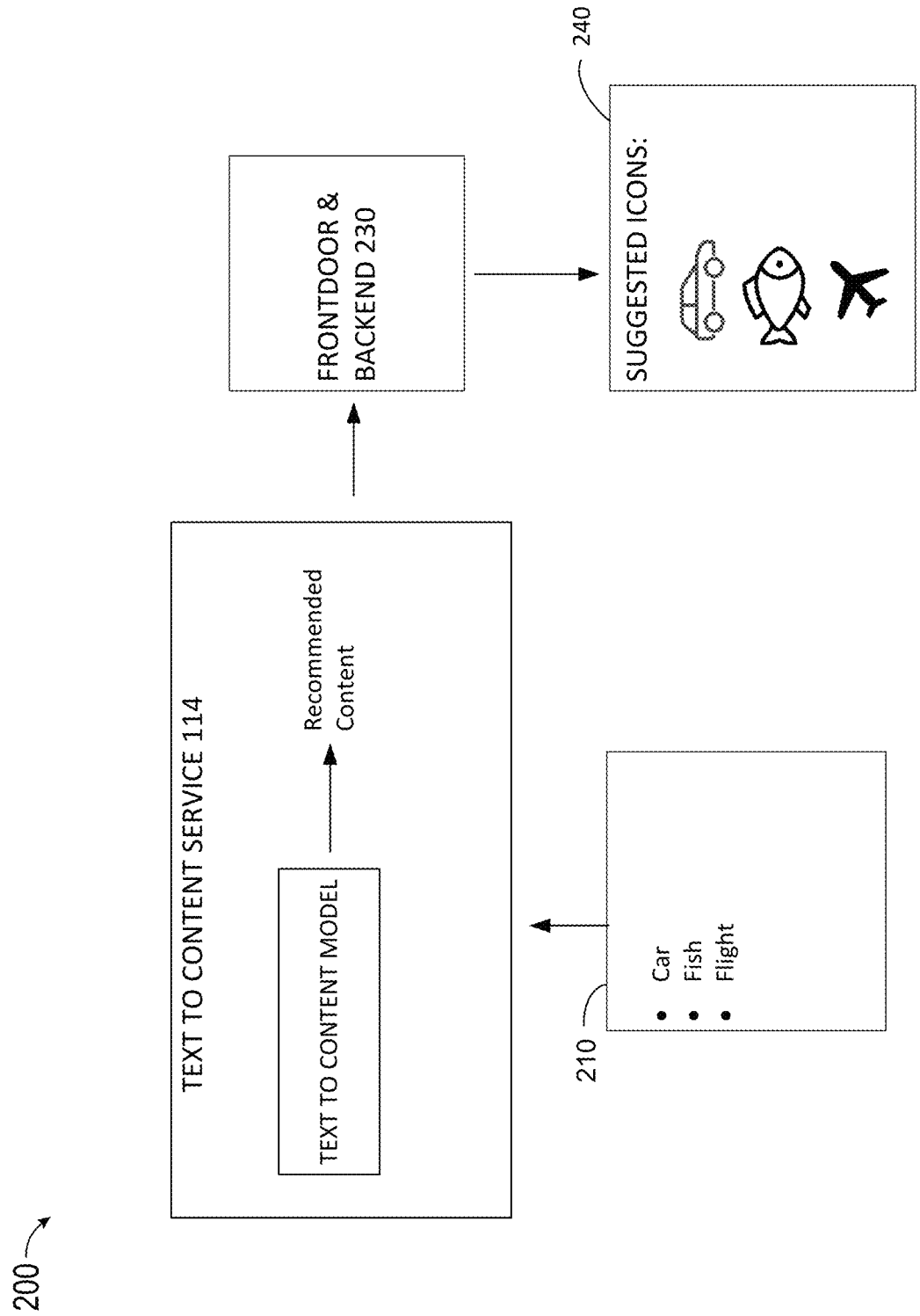
FIG. 2 depicts a simplified example system in which one or more models trained in accordance with the training mechanisms discussed herein may be utilized to provide content recommendations.

FIG. 2 illustrates a simplified example system 200 in which one or more models trained in accordance with the training mechanisms discussed herein may be utilized to provide content recommendations. In one implementation, an application may receive user input via a user interface 210. The entered input may be a portion of text entered on a page (e.g., one slide of the presentation or a page of a word document) of the application. The input data may comprise a single word or any practical number of words, from which feature data may be extracted and input to the text-to-content service 114 which uses the trained models to provide recommended content such as recommended icons. The text-to-content service may be provided by a remote server. Alternatively, the trained model may be available locally to the application to provide some recommended content, while offline, for example.

The recommended content (e.g., suggested icons) may be processed by a front door and backend unit 220 which may handle the layout and prioritization of the recommended content when it is presented to the user in a user interface element such as user interface element 240. In one implementation, the trained models may assign a score to each recommended content (e.g., each suggested icon) based on the input text and the top ranked recommended content may be presented to the user. Thus, once a user enters a set of data in the application, highly related content may be presented quickly and efficiently to the user for easy selection. For example, when the user enters the words car, fish and flight, corresponding icons for a car, fish and an airplane may be provided as recommend icons to use.

Figure 3:
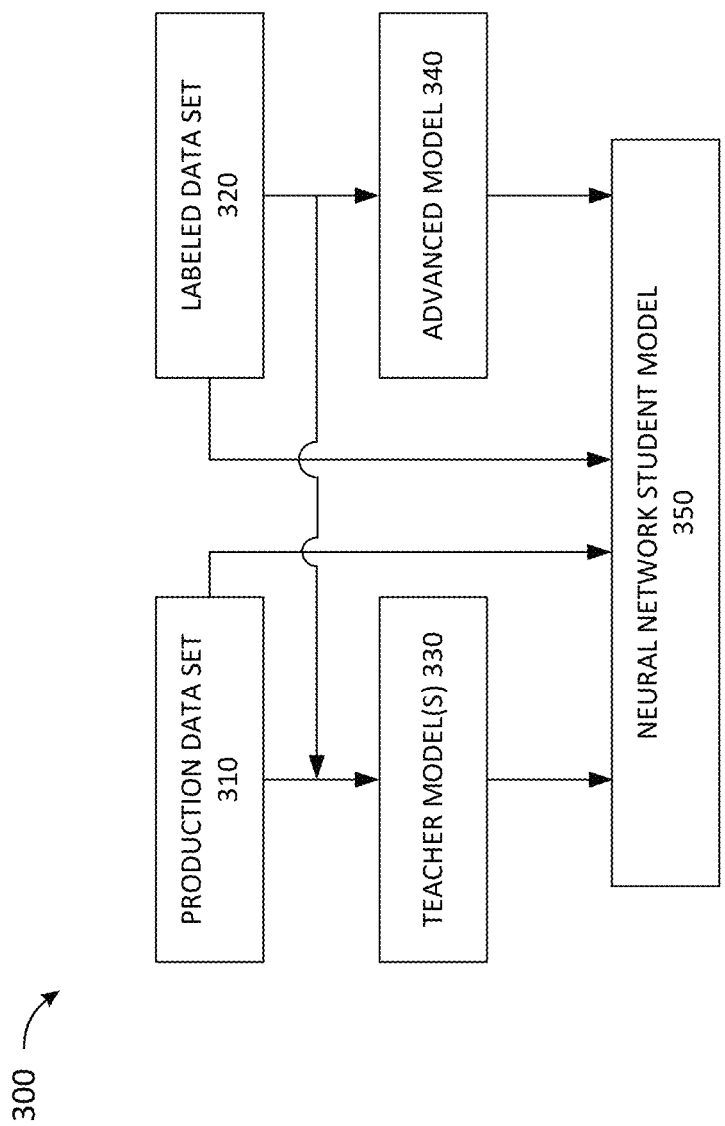
FIG. 3 is an example model architecture for training a text-to-content recommendation model.

FIG. 3 depicts an example simplified architecture 300 for training a text-to-content recommendation model. The architecture 300 may include one or more data sets for training the various models in the architecture 300. The data sets may include a production data set 310 and an annotated data set 320.

The production data set 310 may contain user data which is collected during use of one or more applications. For example, when users select a recommended content (e.g., a recommended icon), this information along with the text for which the recommended content was provided may be collected and stored for ML training purpose. Thus, the production data set may contain one or more sets of domain specific labeled data which have domain knowledge of the application(s). As discussed above, to ensure privacy, stored user data may not include all the words included in the original input text. For example, a filtering method may be used to filter out certain words. Furthermore, not all words in user input data can be logged because of constrains on the size of the dictionary used in the training algorithm. In an example, about 30% of words in a sentence may be randomly masked. Additionally, for privacy purposes, words in a sentence may be shuffled to change their order and thus make it harder to infer the original user input. Thus, the production data set may include an unordered set of words, some of which may be masked. This may be referred to as a bag of words data. Because the production data set contains tokens that are in a random order, when used for training a ML model, the resulting model may lack some accuracy. Furthermore, such a data set when used with an advanced ML model may not provide good quality results.

To address this technical problem, the technical solution makes use of an annotated data set 320. The annotated data set may include full sentences that are annotated by using a labeling service (e.g., human labeling). The process may involve creating one or more sentences for each identified content (e.g., each icon or each image). However, because of the significant number of available content (e.g., thousands of icons) and because new content is often being added to different applications, the process of creating annotated data sets for the available content may be very time consuming and as a result expensive. Thus, only a limited number of sentences (e.g., two or three) may be created for each content ((e.g., thousands of icons), resulting in a small data set.

In one implementation, to address this limitation, in addition to human annotated data, publicly available sentences that may relate to the available content may also be used in the annotated data set 320. This may involve identifying publicly available information that relates to each content. For example, internet articles that relate to each icon (e.g., Wikipedia articles for each icon) may be identified. Once a publicly available source that relates to an icon is identified, the sentences in the source may be used as full sentences for the icon in the annotated data set 320. This may include some weakly labeled data, as each sentence in the source may not be completely related to the icon. However, because a majority of the sentences may be related and because this provides an inexpensive source of labeled data, such data may be added to the annotated data set 320 to provide a more comprehensive set of data. In one implementation, use of such data was shown to improve the quality of the trained model.

In one implementation, the architecture 300 may include an advanced model 340. The advanced model 340 may be a pretrained off-the-shelf model for natural language processing (NLP) which is trained according to known pre-training techniques for NLP systems. These techniques may include BERT, RoBERTa, or Turing. Such pretraining is often extensive and comprehensive and the resulting model has a significant number of parameters. Thus, the resulting advanced model 340 may be significantly large and resource intensive to store and operate. Such a model may not comply with the latency requirements of services such as the text-to-content service. Furthermore, the advanced model 340 may respond better to being trained with full sentences as opposed to production data which is in random order. Thus, even though the advanced model 340 may provide highly accurate results when trained with an appropriately sized labeled data set, use of such a model in everyday computer applications may not be practical. However, when trained with the annotated data set 320, the advanced model 340 may provide valuable input for training a student model 350.

To make use of information provided in the production data set 310 and thus increase the accuracy and efficiency of the resulting student model 350, the architecture 300 may also include one or more teacher models 330. In one implementation, the teacher models 330 are deep neural network (DNN) teachers such as traditional semi-supervised neural network (NN) teachers. The teacher models 330 may include multiple teachers which may be trained using different features, datasets (labeled or unlabeled) or hyperparameters. Initial training of a large number of teachers may be resource and time consuming. However, the output provided by the teachers my cover a variety of aspects and as such may result in significant improvement in the quality of the student model 350. As a result, a large number of teacher models may be trained in the architecture 300. The output of the teacher models 300 may be a SoftMax distribution which can be used to train the student model 350.

Once the teacher models 330 are trained and the advanced model 320 is finetuned, the output of the teacher models 330 and the advanced model 350 may be used along with the production data set 310 and the annotated data set 320 to train a light-weight student model 350. In one implementation, the student model 350 may be a shallow neural network model (e.g., having one or two layers). Thus, the student model is configured to distill knowledge from the deep neural network models and the pretrained NLP model to provide a shallow neural network student model at minimal loss of accuracy.

The resulting student model may be able to provide similar or better results than more complex models because of the process of teacher-student training. This is because, in deep neural networks, the normal training objective is to maximize the average log probability of the correct answers. However, during the training process small probabilities are assigned to incorrect answers. Even when these probabilities are very small, some of them are much larger than others. The relative probabilities of incorrect answers contain important information about the differences among incorrect answers. Accordingly, a set of accurate teacher models may be trained to learn the small probabilities among incorrect labels of a training data set. This learned information may then be used to train a student model that learns from both the original labels and the soft labels generated by the teacher models to improve its accuracy without adding significant model parameters.

Figure 4:
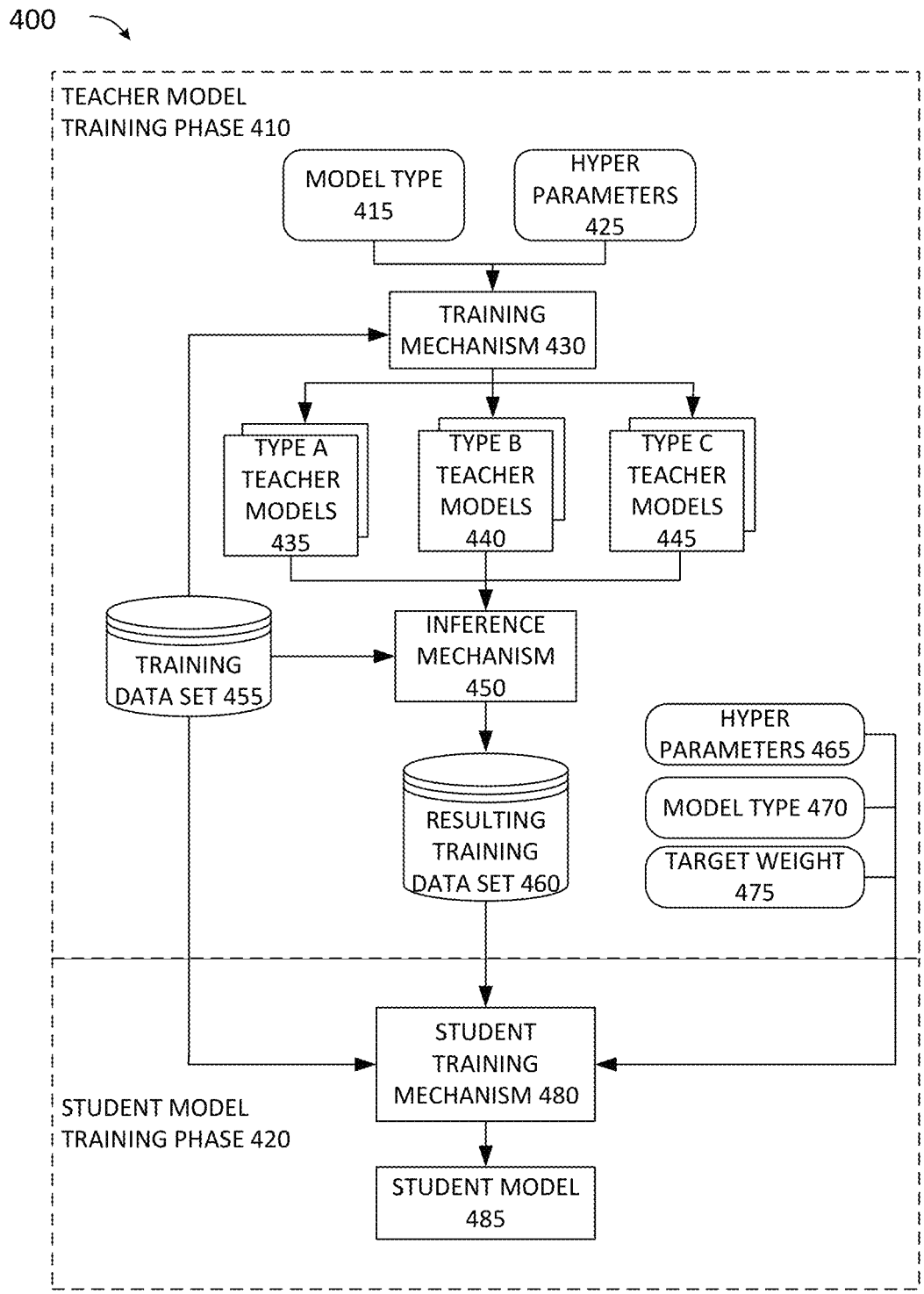
FIG. 4 is an example simplified teacher-student training architecture for training a student model based on a plurality of teacher models.

FIG. 4 depicts an example simplified teacher-student training architecture 400 for training a student model based on a plurality of teacher models. The teacher-student training architecture 400 may include a teacher model training phase 410 and a student model training phase 420. The first phase of the simplified teacher-student training architecture 400 may involve training the teacher models to generate a resulting training data set 460, as further discussed below. The second phase of the simplified teacher-student training architecture 400 may involve using the information provided by the trained teacher models to train the student model 485.

The teacher model training phase 410 may include training a variety of teacher models such as type A teacher models 435, type B teacher models 440 and type C teacher models 445 using different model structures and hyperparameters. The different teacher models may provide variations in model performance and output distribution. In an example, the model type 415 and hyper parameters 425 may be provided to a training mechanism 430 for training each of the teacher models which may then utilize the information to train each teacher model. In one example, this may involve training several semi-supervised DNN models (e.g., a semi-supervised DNN model for text to icon recommendations) and a number of FastText models using different hyperparameters, such as dropout rate and hidden layer dimensions. In one implementation, one of the teacher models may be an advanced pretrained NLP model (e.g., Roberta, BERT, Turing, UniLM, Unicoder, or a combination of these models). Such a model may be trained by using full sentence labeled data.

Once the models are trained, the teacher models may be executed with the training data set 455 to generate the resulting training data set 460. This may be achieved by utilizing an inference mechanism 450 which receives both the training data set 455 and the output of each of the models 435, 440 and 445 to infer the resulting training data set 460. The resulting training data set 460 may be referred to as a transfer data set which contains soft labeled training data. The soft labeled training data may provide the probability of a class for each label. The probability may be calculated by utilizing the logit function which may also be regularized by adding noise to the function. In another example, the probability distribution may be obtained by using a softmax function.

Once the soft labeled training data is generated from the teacher models, the resulting training data set 460 can be provided to a student training mechanism 480 to train the student model 485. In one implementation, the student model may be a semi-supervised DNN model with a modified training objective. The modified training objective may be achieved by using the weighted sum of the original label (training data set 455) and the soft target label (the resulting training data set 460). The desired weights for this sum may be provided to the training mechanism 480 via the target weight 475. Additionally, the student training mechanism 480 may receive the hyper parameters 465 and the model type 470. By utilizing the hyper parameters 465, model type 470, target weight 475, original training data set 455 and the resulting training data set 460, the student model 485 may be trained to provide more accurate results while having a smaller structure. The trained student model may provide improved accuracy by distilling knowledge from the teacher models without increase overhead in inference.

In an experiment using the disclosed training mechanism to train a student model for text-to-icon recommendations, significant improvements in quality were observed. Table 1 provides a list of parameters and test results for various models.

TABLE 1

| Model Type | Total Parameters | Training Time | Accuracy | Runtime (ms) |
| --- | --- | --- | --- | --- |
| DNN Teacher | 170K | About 3 hours | 0.441 | 1.260 |
| Advanced Teacher | 355M | About 10 hours | 0.590 | 500 |
| Student model (not using advanced teacher) | 60k | About 2 hours | 0.431 | 0.441 |
| Student model (using advanced teacher) | 60k | About 2 hours | 0.472 | 0.453 |

The total parameters number in table 1 indicates the number of parameters used to train each model, while the training time provides the amount of time needed for the training. Accuracy provides the rate of accuracy for each model based on the experiments conducted and runtime depicts the amount of time used to run each model to provide a recommendation. Table 1 illustrates that each of the DNN teacher and the advanced teacher require a larger number of input parameters and a longer training time, while both of the student models can be trained with a low number of parameters in a shorter time period. Furthermore, while the student model that does not use the advanced model in its training demonstrates decreased accuracy (when compared to the DNN teacher and the advanced teacher), the student model trained by using the advanced model provides increased accuracy over the DNN teacher. Moreover, both of the student models can be run in a shorter amount of time. As a result, the student model trained using the advanced teacher can be trained faster and easier and provides more accurate and faster results.

Figure 5:
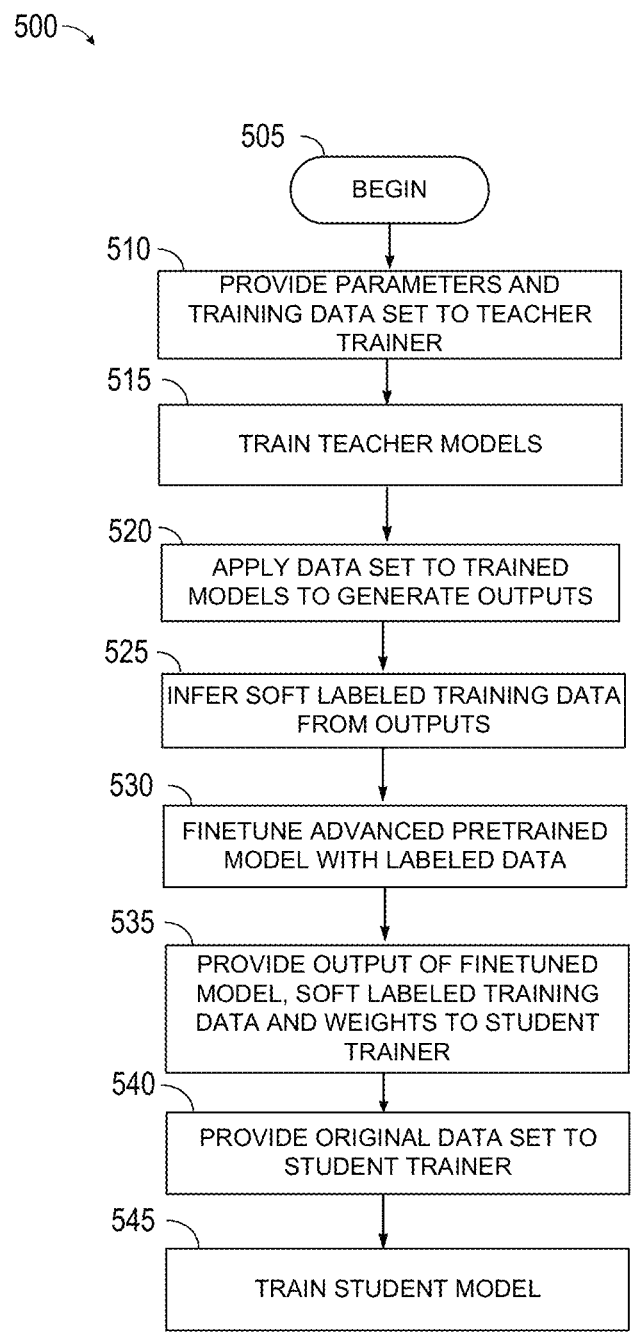
FIG. 5 is a flow diagram depicting an example method for training a student model to provide accurate results.

FIG. 5 is a flow diagram depicting an exemplary method 500 for training a student model to provide accurate results efficiently. The method 500 may begin, at 505, and proceed to provide hyper parameters along with a training data set to a teacher training mechanism, at 510. The training data set may include both production data and labeled data. As discussed above, the production data may be application specific data based on user data received from the application and logged in a data set designed for use by a training mechanism. This may be a large-scale data set that includes unordered queries containing masked words. The size of the data set may be determined by the size constraints of the dictionary designed for the training algorithm and may vary depending on the application. The labeled data may include full sentences that are either labeled by a human or are weakly related full sentences retrieved from public sources. In implementations that include training multiple types of teacher models, the training mechanism may also receive model types as an input to identify the types of models that should be trained.

Once all required input data and parameters have been received, method 500 may proceed to train one or more teacher models, at 515. Once the teacher models have been trained, the training data set may be provided to the teacher models to generate outputs, at 520. The output may then be used by an inference mechanism to infer soft labeled soft labeled training data, at 525.

In one implementation, in concurrence with or after the training of the teacher models, an advanced pretrained model may be finetuned (e.g., further trained), at 530. This may be achieved by utilizing a labeled data set to finetune the pretrained model. The output of the finetuned pretrained model may then be supplied along with the soft labeled training data and the target weights to a student training mechanism, at 535. Additionally, the original data set (e.g., including the production data and the labeled data) may be provided to the student training mechanism, at 540. Once all required data has been provided (which may also include hyper parameters and model type), the data may be used to train the student model, at 545. This may involve utilizing the target weights to calculate a weighted sum of the original label (data from the original training data set) and the soft target label (data from the soft labeled training data set). The weighted sum may then be used to train the student model. In this manner, the student model may distill knowledge from each of the trained teacher models in addition to the finetuned pretrained model. By distilling knowledge from these complex models and utilizing that knowledge in making predictions, the student model may be to provide highly accurate results while having a simple structure.

Thus, methods and systems for providing cross data set knowledge distillation in training light-weight ML models are provided. Knowledge may be distilled from multiple complex models to generate a simple and small model that provides highly accurate results. This may be achieved by first training a plurality of complex teacher models having specific parameters and specifications and then using the trained teacher models to provide soft labeled data for training a simple student model. To further improve the quality of the student model, an advanced pretrained NLP models may also be utilized as a teacher. The pretrained NLP model may be trained with annotated data to provide additional knowledge for training the student model. In this manner, knowledge is also distilled from state-of-the-art complex models that are highly accurate. This may result in a heavy training light inference system that utilizes cross-data set knowledge distillation to train a highly accurate, yet small in size trained model. This can improve the quality of the final model which complies with latency requirements and is efficient to store and operate.

Figure 6:
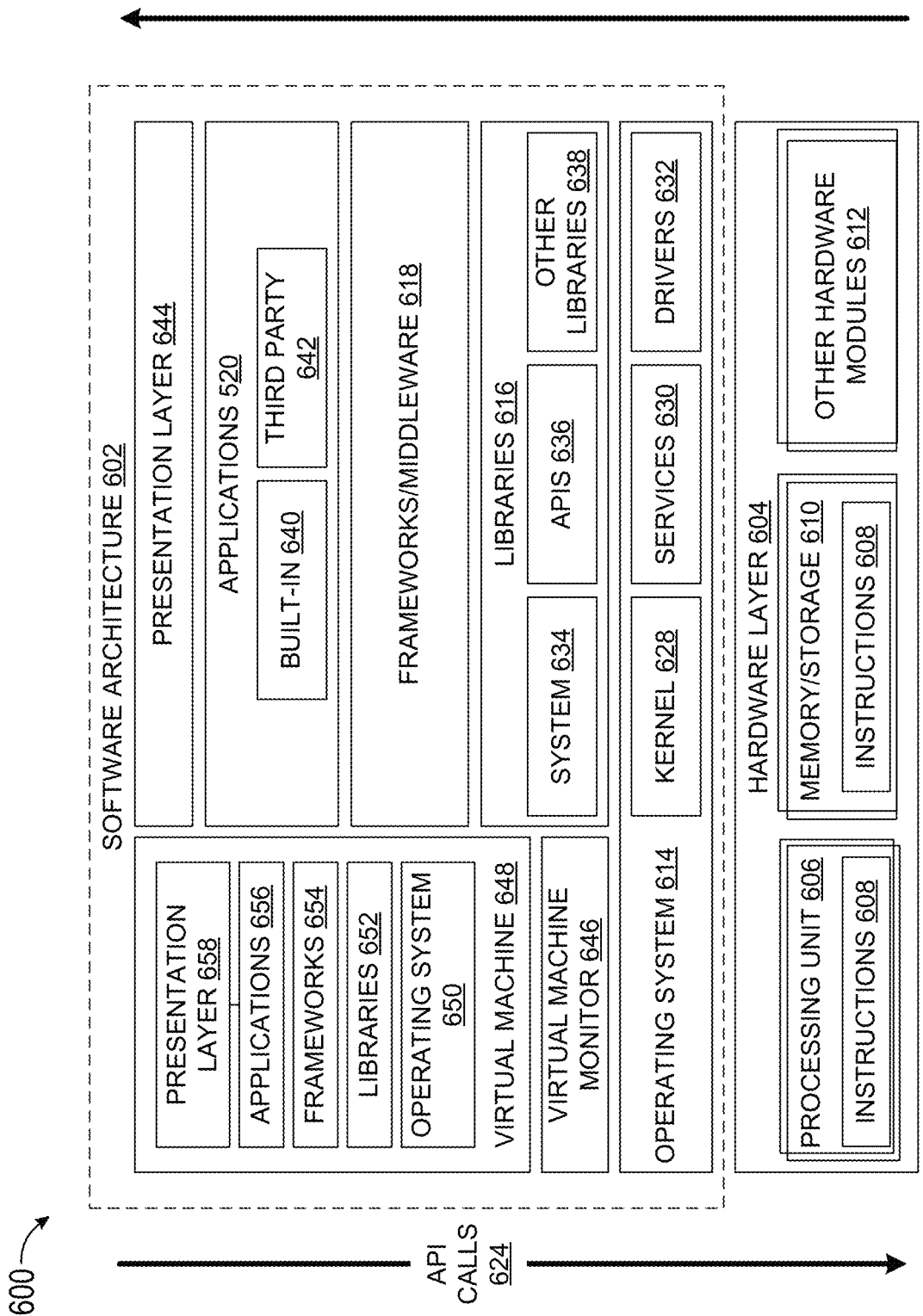
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
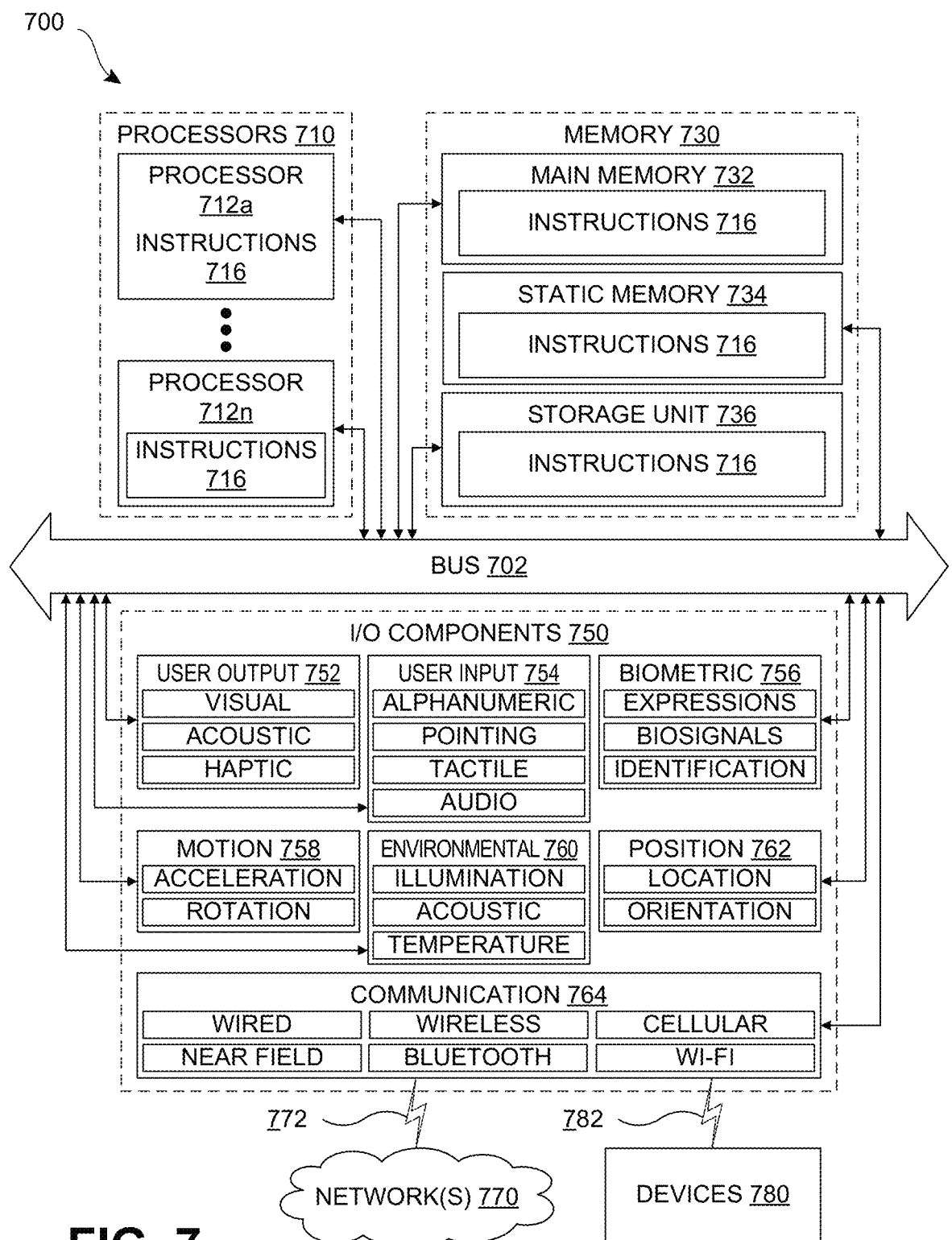
FIG. 7 is a block diagram illustrating components of an example machine configured to read instructions from a machine-readable medium and perform features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
training a first machine-learning (ML) model using a first training data set;
providing as input to the trained first ML model a set of labeled unordered training data to generate a transfer data set;
training a pretrained text analysis model using a labeled training data set;
executing the pretrained text analysis model to generate an output; and
utilizing the transfer data set and the output to train a text-to-content recommendation ML model for recommending content based on text,
wherein:
the text-to-content recommendation ML model is used by a text-to-content service provided by a server that receives a text portion as an input and provides the text portion to the text-to-content recommendation ML model and receives a plurality of recommendations for content that correspond with the text portion as an output of the text-to-content recommendation ML model, and the server provides the plurality of recommendations for content to a backend unit that ranks the plurality of recommendations for presentation to a user.

2. The data processing system of claim 1, wherein the first ML model is a deep neural network (DNN) model.

3. The data processing system of claim 1, wherein the text-to-content recommendation ML model is a shallow neural network model.

4. The data processing system of claim 1, wherein the instructions further cause the data processing system to train a plurality of first ML models.

5. The data processing system of claim 4, wherein the plurality of first ML models include a pretrained natural language processing (NLP) model.

6. The data processing system of claim 5, wherein:
the plurality of first ML models include a DNN model, and
the DNN model is trained using labeled unordered words in the first training data set.

7. The data processing system of claim 1, wherein the pretrained text analysis model is trained using full sentence labeled data.

8. A method for training a text-to-content recommendation machine-learning (ML) model, the method comprising:
training a first ML model using a first training data set;
providing as input to the trained first ML model a set of unlabeled unordered training data to generate a transfer data set;
training a pretrained text analysis model using a labeled training data set;
executing the pretrained text analysis model to generate an output; and
utilizing the transfer data set and the output to train the text-to-content recommendation ML model for recommending content based on text,
wherein:
the text-to-content recommendation ML model is used by a text-to-content service provided by a server that receives a text portion as an input and provides the text portion to the text-to-content recommendation ML model and receives a plurality of recommendations for content that correspond with the text portion as an output of the text-to-content recommendation ML model, and
the server provides the plurality of recommendations for content to a backend unit that ranks the plurality of recommendations for presentation to a user.

9. The method of claim 8, further comprising training a plurality of first ML models.

10. The method of claim 9, wherein the plurality of first ML models include a pretrained natural language processing (NLP) model and a deep neural network (DNN) model.

11. The method of claim 10, wherein the pretrained NLP model is trained using annotated full sentence data, and the DNN model is trained using labeled unordered words in the training data set.

12. The method of claim 8, wherein the pretrained text analysis model is trained using full sentence labeled data.

13. The method of claim 8, further comprising:
determining a weighted sum of data in the first training data set and data in the output; and
utilizing the weighted sum to train the text-to-content recommendation ML model.

14. The method of claim 8, further comprising receiving hyper parameters for of the first model and the text-to-content recommendation ML model.

15. A non-transitory computer readable medium on which are stored instructions that, when executed, cause a programmable device to:
train a first machine-learning (ML) model using a first training data set;
provide as input to the trained first ML model a set of unlabeled unordered training data to generate a transfer data set;
train a pretrained text analysis model using a labeled training data set;
execute the pretrained text analysis model to generate an output; and
utilize the transfer data set and the output to train a text-to-content recommendation ML model for recommending content based on text,
wherein:
the text-to-content recommendation ML model is used by a text-to-content service provided by a server that receives a text portion as an input and provides the text portion to the text-to-content recommendation ML model and receives a plurality of recommendations for content that correspond with the text portion as an output of the text-to-content recommendation ML model, and
the server provides the plurality of recommendations for content to a backend unit that ranks the plurality of recommendations for presentation to a user.

16. The non-transitory computer readable medium of claim 15, wherein the text-to-content recommendation ML model is a shallow neural network model.

17. The non-transitory computer readable medium of claim 15, wherein the instructions further cause the programmable device to train a plurality of first ML models.

18. The non-transitory computer readable medium of claim 17, wherein the plurality of first ML models include a natural language processing (NLP) model and a deep neural network (DNN) model.

19. The non-transitory computer readable medium of claim 18, wherein the NLP model is trained using annotated full sentence data and the DNN model is trained using labeled unordered words in the training data set.

20. The non-transitory computer readable medium of claim 15, the pretrained text analysis model is trained using full sentence labeled data.

* * * * *